Patented Dec. 11, 1928.

1,694,620

UNITED STATES PATENT OFFICE.

ALPHONS O. JAEGER, OF CRAFTON, PENNSYLVANIA, ASSIGNOR, BY MESNE ASSIGN-MENTS, TO THE SELDEN RESEARCH & ENGINEERING CORPORATION, OF PITTS-BURGH, PENNSYLVANIA, A CORPORATION OF DELAWARE.

BASE-EXCHANGE BODY.

No Drawing. Application filed February 28, 1927. Serial No. 171,727.

This invention relates to base exchanging bodies and particularly to base exchanging bodies having catalytic activity.

It has been proposed in the past to produce base exchange bodies by bringing about the reaction of an alkaline solution of amphoteric metal hydroxide with a non-alkaline solution of another metal hydroxide which is capable of precipitating the first, the proportions of the two components being chosen so that the resulting mixture is substantially neutral to phenolphthalein or similar indicators. The precipitate is usually removed from the mother liquor and treated in the usual manner. Products produced by this method possess more or less base exchanging power and can, therefore, be used for the softening or purification of water.

I have found that when suitable components are used, base exchange bodies of the above described character can be produced which are active catalysts for a number of catalytic reactions. More particularly, I have found that excellent catalysts can be produced by causing at least one metallate component to act with a plurality of different metal salts instead of with a single metal salt or vice versa. These base exchange bodies in which a plurality of metal salts are caused to react with a single metallate component have never been produced hitherto, so far as I know, and constitute a new class of chemical compounds.

All of the base exchange bodies, according to the present invention, that is to say, catalytically active bodies which are prepared by the reaction of a single metallate with a single metal salt or bodies produced by the reaction of at least one metallate with a plurality of metal salts or vice versa, possess a remarkably porous, honeycomb-like structure and in some cases opalescent structure. When suitable catalytically active components are present in the products, they form catalysts of remarkable tenacity, due probably to the extraordinarily high surface energy of the microscopically porous structure and probably, also, to the presence of unsaturated valences in many cases and asymmetry of molecules. It is, of course, possible that the catalytic activity of the products is due partly or wholly also to other reasons and the present invention is not intended in any sense to be limited by any theory of action of the products. The molecular complexes which are present are apparently of great size and complexity and the exact chemical constitution has not been determined. In fact, I do not even know definitely whether single chemical compounds are formed in any or all cases and it is possible that molecular mixtures are present. The products possess a physically microscopical homogeneity and behave in many ways as if they were single compounds and I am of the opinion that probably in many cases the products are in fact single compounds of very high molecular weight, but the invention is not limited to any theories of the chemical constitution of the products.

It should be clearly understood that the present products are chemically quite distinct from base exchanging bodies containing silicon, such as, for example, the zeolites and related base exchange bodies. The present compounds contain no silicon in their structure, and while they share many of the physical properties of zeolites, namely, the highly porous, honeycomb-like structure and the power of exchanging their alkali cations for other cations by base exchange, they are chemically distinct products. Surprising as it may seem, the presence of silicon, which has hitherto been considered as essential to the formation of the honeycomb-like skeletons of zeolite products, appears to be only one of many elements which are capable of bringing about these structures and the base exchange bodies of the present invention possess all of the mechanical strength and resistance of the silicious zeolites, properties which are, of course, of utmost importance in catalytic reactions.

A number of elements are capable of forming alkali metallates, at least in their higher states of oxidation, and can be used singly or in mixtures as the metallate components for producing base exchange bodies of the present invention, it being understood, of course, that the choice will depend on the metal salts to be used and on the catalytic effects which it is desired to produce. Among the elements which form metallates are the following: aluminum, chromium, zinc, vanadium, beryllium, tin, palladium, ruthenium, rhodium, osmium, platinum, titanium, zirconium, lead, uranium, tantalum. The elements which form the metallates may be present in the form of their oxides or hydroxides united with alkali to form simple metallates or they may be present partly or wholly in the form of complex compounds, such as, for example, ammonia complexes, cyanogen complexes, and the like. In general, the complex compounds described in the co-pending application of Jaeger and Bertsch, Serial No. 100,116, filed April 19, 1926, may be used.

The metal salt components include the water soluble neutral or acid salts of the following elements: copper, silver, bismuth, gold, beryllium, zinc, cadmium, boron, aluminum, rare earths, titanium, zirconium, tin, lead, thorium, niobium, antimony, tantalum, chromium, molybdenum, tungsten, uranium, vanadium, manganese, iron, nickel, cobalt, osmium, iridium, platinum, palladium, which may be used alone or in any desired mixture. It is an advantage of the present invention that definite proportions of the individual compounds do not need to be used, either because mixtures of different compounds are formed, or more probably because the tremendous size and complexity of the molecule masks any requirements for definite proportions.

All of the products of the present invention possess base exchanging powers to a greater or less extent when first prepared in solutions which are substantially neutral to phenolphthalein. For catalytic purposes, however, the base exchanging power of the products is not required in catalytic reactions themselves and it is therefore possible to depart considerably from the optimum conditions of products as far as base exchange power goes. In other words, the limits of alkalinity, neutrality or acidity are much wider than in the case of products which are to be used for water softening and which therefore depend primarily on their base exchanging power. While usually the highest base exchanging powers are obtained when the compounds are produced in a mixture which is substantially neutral to phenolphthalein, the products having a similar physical structure and being desirable for many catalytic reactions, they can be prepared with somewhat different proportions of the components so that at the end of the reaction the mixture may possess any alkalinity or acidity between phenolphthalein red and litmus blue as indicator end points.

Hitherto, even base exchange bodies which contain a single metallate and a single metal salt have been prepared only in solutions which are substantially neutral to phenolphthalein or at most slightly alkaline. I have found that when the solution becomes acid to phenolphthalein, products are obtained which still possess much of the physical structure of the base exchange bodies and which for some purposes are valuable catalysts. These products which are prepared in a solution which is acid to phenolphthalein, are not known and constitute new products. I do not known what the chemical constitution of these acid reaction products are, but I am of the opinion that they probably consist in mixtures of different chemical compounds.

The possibilities of producing catalysts according to the present invention are not limited to the reaction products of the metallates and metal salt components which may be used and which are present in the molecules in a non-exchangeable form. On the contrary, a further series of products can be prepared by exchanging part or all of the alkali cations for other atoms or radicals by means of base exchange. The number of cations which can be introduced is very large and some of them are included in the following elements and radicals: ammonium, copper, silver, gold, beryllium, magnesium, cæsium, zinc, strontium, cadmium, barium, mercury, radium, aluminum, scandium gallium, yttrium, indium, ytterbium, thallium, titanium, zirconium, tin, antimony, thorium, vanadium, arsenic, niobium, tantalum, bismuth, chromium, molybdenum, tellurium, tungsten, uranium, manganese, iron, cobalt, nickel, ruthenium, rhodium, palladium, osmium, iridium, platinum, hafnium. These cations may be introduced either singly or in mixtures simultaneously or successively. The wide possibilities of combination which can be effected by the introduction of various cations by means of base exchange gives the catalytic chemist an almost infinite field of choice in preparing catalysts having just the right degree of activity for the particular purposes for which they are intended, and it is an advantage of the present invention that catalysts of exceedingly finely adjusted activity can be produced and are effective in substantially all of the important catalytic reactions in use today. The cations introduced by base exchange may be themselves catalytically active or they may activate catalytic components which are present in the products in non-exchangeable form. Cations may also be introduced as simple ions or as complex ions. In all cases, the catalytic activity of the products produced is enhanced by the favorable physical structure of the products.

A further series of products can be obtained by treating the base exchange bodies of the present invention either with or without the presence of cations introduced by base exchange, with products containing anions which are capable of reacting with the base exchange body to form salt-like products. These products may be partly or wholly insoluble in water, but for most purposes relatively insoluble products are preferable and this limits somewhat the number of acid radicals which can be treated with a given base exchange body since all of the acids do not form insoluble compounds with all of the base exchange bodies. In its broader aspects, however, the invention is not limited to any particular solubility of product. Acids of the following elements, either simple acids, polyacids or complex anions can be used in producing salt-like bodies with the base exchange bodies of the present invention: vanadium, tungsten, uranium, chromium, molybdenum, manganese, tantalum, niobium, antimony, selenium, tellurium, arsenic, phosphorus, titanium, bismuth, aluminum, lead, tin, zinc, sulfur, chlorine, platinum, boron, zirconium, thorium. Complex ions such as for example, ferro and ferricyanogen, sulfocyanogen, metal cyanogen, ammonia complexes and the like may also be used wherever they form salt-like bodies with the base exchanging bodies of the present invention. A single acid radical may be introduced or a mixture may be used either by a simultaneous or successive treatment. The amount of the acid radical used may also be varied so that the products may possess the character of acid neutral or basic salts.

The large number of products which can be produced according to the present invention permits the catalytic chemist to choose a catalyst having the right characteristics for any particular catalytic reaction and the products may be used in practically all catalytic reactions such as, for example, synthesis of methanol or motor fuel, gas purification, gas absorption, gas separation, removal of contact poison such as, for example, volatile metal compounds, sulfur, arsenic and the like, for absorption or adsorption in liquid, gaseous or suspended phase and for catalytic oxidations, reductions, dehydrations, hydrogenations, dehydrogenations, condensations, polymerizations, depolymerizations, halogenations and the like.

For some purposes, it may be desirable to use the base exchange bodies of the present invention alone. Their catalytic activity, however, is so great that in most cases it is possible and usually desirable to dilute the products with more or less inert carriers or with carriers of catalytic activity or of catalytic activating power. The carriers are of two types, finely divided carriers which may be mixed with finely divided base exchange bodies of the present invention, but which are preferably incorporated therewith during formation so that they form with the base exchange bodies a microscopically homogeneous framework. The incorporation may be in the component solutions or in the reacted mixture during formation or the base exchange bodies may be formed in the pores of finely divided porous diluents. In all cases, whether the diluents or the base exchange bodies are in the disperse phase or whether there is a combination, the resulting products are homogeneous wholes and constitute the preferred form of diluted contact masses of the present invention. It is also possible to coat base exchange bodies with or without dilution of finely divided diluents onto fragments of carriers or the base exchange body may be impregnated into the pores of relatively massive carrier fragments. For some purposes, catalysts produced in this way possess marked advantages and are included in the present invention. The method of introducing diluents and the various possibilities of combination are described in connection with zeolites which, although chemically different from the products of the present invention, are formed in a somewhat similar manner and are described in detail in the co-pending application of Jaeger and Bertsch, Serial No. 95,771, filed March 18, 1926, and will not be described in detail in the present application, except in the specific examples which follow and which illustrate a few typical products, some of which are homogeneously incorporated with diluents. The diluents may be catalytically active, inert or they may have activating or stabilizing effects or may promote stabilization of the catalysts.

While in many cases, both metallate components and metal salt components may be catalytically active, the invention is in no sense limited to such products and some very important catalysts can be prepared in which one or more of the components are catalytically active and other components while possessing little or no catalytic activity themselves may be activators for the catalytically active components. Very finely tuned catalysts of this type may be produced. In a similar manner, of course, the components introduced by base exchange or in the form of anions when salt-like bodies are prepared, may be catalytically active or may be activators.

The catalytically active base exchange products, which have been referred to above, all contain the catalytic component in chemical combination in the base exchange body itself. This class of compunds constitutes perhaps the most important group covered by the present invention. In some cases, however, catalysts can be prepared in which catalytically active diluents are present and the base exchange body acts both as a cementing medium or mechanical framework for the catalytic diluents and may frequently contain components which, while themselves possessing relatively small catalytic activity, nevertheless, activate or promote the activity of the catalytic diluents. The microporous structure of the base exchange bodies with its desirable physical characteristics is of great importance in such products and in many cases greatly enhances the effectiveness of the catalytic diluents present.

Preferably, the base exchange bodies of the present invention are produced by the reactions of solutions of the components and while concentrated solutions may be used and are of importance in preparing certain catalysts and insecticidal or fungicidal preparations for most products, I find it is of advantage to use relatively dilute solutions, although it should be understood that precise concentrations are usually not essential and that the solutions may vary within wide limits without affecting the quality of the products and it is an advantage of the present invention that many of the products may be prepared without extreme supervision.

The products when first prepared usually precipitate in the form of gels. Sometimes the precipitation is sufficiently rapid without external aid, but frequently particularly in relatively alkaline solutions, the precipitation of the gels is much delayed and in some cases incomplete. I have found that it is advantageous in most cases to utilize agitation and in many cases to utilize moderately elevated temperature or the addition of acidifying means or salting out agents, such as, for example, ammonia salts, salts of the alkalies, alcohols and other organic compounds. In some cases, it is also advantageous to operate under pressure in autoclaves.

The porosity of the products which are prepared may be even further increased by incorporating into the framework of the base exchange body products which can be removed by leaching, volatilization or combustion and which, when removed, leave additional porous spaces and produce an even more advantageous physical structure. The substances added may be of organic or inorganic nature and may be added as individuals or may be in chemical combination with some of the permanent components, thus, for example, certain of the components may be introduced in the way of complex compounds which are later decomposed and then leave additional porous spaces. Examples of such complex compounds are certain ammonia complexes which can be decomposed by heating the finished product.

In general, the reaction of the component solutions results in the production of soluble salts which are not wanted and it is therefore usually desirable to wash the base exchange body after precipitation and then to dry or dry first and then wash. I have found that while it is possible in some cases to dry at high temperatures for the best results in most cases drying temperatures of 100° C. or less are more desirable.

In the general methods described above, a separately prepared metallate component and metal salt components have been caused to react. While for many purposes, these are the preferred methods, it is possible to prepare base exchange bodies by a somewhat different method. Thus, for example, if a solution of a metallate of amphoteric metals, is cautiously neutralized with acid until the strongly alkaline reaction becomes weakly alkaline to phenolphthalein or even slightly acid with weak alkalinity to litmus as a limit, base exchange bodies are produced and in many cases are of importance particularly for catalytic purposes. Instead of the metallates, the amphoteric metals may also be present in the form of complex metallate compounds, for example, such complex compounds as are described in the co-pending application of Jaeger and Bertsch, referred to above.

In a similar manner, acid or neutral solutions of hydroxides or salts of amphoteric metals may be treated with alkali until the mixture becomes neutral or alkaline to phenolphthalein, or even acid, in which case base exchange bodies are produced in a manner similar to that described in the foregoing paragraph. The base exchange bodies produced either by neutralizing metallate solutions or metal salt solutions in general do not show quite as great base exchange power as do those which are prepared by causing ready made metallate and metal salt solutions to react with each other. The physical structure, however, appears to be the same and, as in many cases, particularly for catalytic purposes, extremely high base exchange power is not essential. Many very valuable catalysts can be produced in this manner.

A further wet method of preparation consists in causing alkali metal salts of the oxygen containing acids of metal elements of the fifth and sixth groups of the periodic system, such as, for example, vanadium, molybdenum, tantalum, tungsten, and the like, to react with neutral or acid salts of metals, particularly metals which are strongly amphoteric. Preferably, there should be an excess of alkali. The salts of the fifth and sixth group acids may be used alone or in combination with metallates.

In addition to the wet methods, which for most purposes I find are preferable, base exchange bodies can be produced by fusion methods, for example, by fusing oxides or hydroxides of the metallate and metal salt components with alkali, for example, sodium carbonate or potassium carbonate. The base exchange bodies produced by fusion, while they sometimes do not possess quite as high base exchange powers, are nevertheless of the same microporous honeycomb-like structure and many of the products are very valuable catalysts. Oxides of the metals of the fifth and sixth groups may also be used to form products somewhat similar to those described in the preceding paragraph by fusion methods.

Many of the base exchange bodies of the present invention possess sufficient mechanical strength but in some cases, for example, in certain cases of high dilution, the mechanical resistance may be insufficient and in such cases the products may be washed with a dilute solution of waterglass, producing a surface silicification which adds greatly to the mechanical strength of the product and which does not have any disadvantages in cases where the presence of silicia does not adversely affect the particular catalytic reaction for which the product is to be used. In some cases also, the treatment with dilute waterglass may be advantageous in changing the proportion of base and acid in the product which is sometimes of advantage when the product is to be used in catalyses requiring non-alkaline catalysts. Subsequent treatments with waterglass solutions may therefore be used to enhance the mechanical strength of the product or improve its catalytic activity or to perform both functions.

The most important field of utility of base exchange bodies of the present invention lies, of course, in catalyses of various kinds and it is desirable for many catalytic reactions to subject the catalyst to a preliminary treatment either with oxidizing or acid vapors, particularly for oxidation reactions or with hydrogen or other reducing gases where the catalyst is to be used as a reduction catalyst. These preliminary treatments and in fact, the catalytic reactions themselves in many cases produce a secondary chemical change in the catalyst, particularly at the surface and may markedly affect the base exchanging powers of the catalyst. The present invention is intended to include not only base exchange bodies prepared according to the present invention and which have not been subjected to any further treatment but also such bodies which have suffered secondary chemical transformations either by reason of preliminary treatments or by reactions which have taken place during use in various catalytic reactions.

Many organic oxidations require a slowing down or stabilizing of the catalysts used in order to prevent excessive losses through total combustion. I have found that the presence of salts of alkali-forming metals and other non-catalytic products act as stabilizers or stabilizer promoters. I do not claim in this invention the use of stabilizers in general, as this forms the subject-matter of my co-pending application, Serial No. 196,393, filed June 3, 1927. Many of the base exchange catalysts produced according to the present invention, however, can be incorporated with stabilizers or stabilizer promoters can be produced by causing the base exchange bodies to react with acids or acid vapors, the alkali radicals present in the base exchange body reacting partly or wholly with the acid radicals to form stabilizers in intimate admixture with the base exchange body.

Many of the examples describe the treatment of base exchange bodies to produce stabilizers therein. In addition to stabilizers, there are some products products which appear to enhance the activity of the stabilizers, although themselves possessing practically no stabilizing effect. Thus, for example, many materials rich in silica appear to enhance or promote the stabilizing action of alkali-forming metal salts or similar stabilizers and I call these products "stabilizer promoters" for want of a better name. Various stabilizer promoters can be incorporated in the base exchange bodies of the present invention, either in the form of diluents, for example, diluents rich in silica such as kieselguhr, and the like, or by treating the base exchange body after formation, as, for example, by washing with dilute waterglass solution, which, in addition to enhancing the mechanical strength and adjusting the alkalinity as described in the foregoing paragraph, in many cases, also introduce sufficient silica to act as a promoter to stabilizers which may be present in the base exchange body. Such composite catalysts are, of course, included within the scope of the present invention.

The invention will be described in greater detail in connection with the following specific examples which illustrate the production of a few typical products of the present invention and which also illustrate a few of their many fields of utility. It should be understood, of course, that the details of the specific examples in no sense limit the broad scope of the invention, but on the other hand certain specific features which may be described in certain of the examples are included as specific features of the invention.

*Example 1.*

40 parts of $V_2O_5$ are suspended in 500 parts of water and acidified with a little concentrated sulfuric acid. The suspension is heated almost to the boiling point of the water and gases containing $SO_2$ are passed through until the vanadic acid suspension is completely dissolved as blue vanadyl sulfate. The blue solution is then divided into two parts, one of which is kept as such and the other treated with 5N potassium hydroxide solution at 50–60° C. until a clear coffee brown solution is obtained. This solution is then mixed with 70 parts of celite or 40 parts of celite and 40 parts of fine quartz fragments, the mixture being stirred until it becomes uniform. Other diluent bodies, such as ground glass, neutral silicates, sand, silica gel, ground rocks, tuffs, lava of volcanic or eruptive origin, pumice meal or asbestos fibres, or similar materials which are rich in silica may be used.

To the suspension containing potassium vanadite, the second half of the vanadyl sulfate solution is added, care being taken that even after all of the vanadyl sulfate has been added, the solution remains alkaline or neutral to phenolphthalein. The reaction product, after separation from the mother liquor by filtration and drying at 60–70° C., is broken into fragments and constitutes a base exchange body containing potassium and tetravalent vanadium, part of the vanadium playing the part of an acid radical and part of a base in the non-exchangeable portion of the molecule.

The product obtained is excellently suited for the catalytic oxidation of toluol to benzaldehyde, chlortoluols, dichlortoluols, chlorbromtoluols, nitrotoluols, chlornitrotoluols, bromnitrotoluols and the like, to the corresponding substituted benzaldehydes, the vapors of the compounds being passed with air in the proportion of 1:15 to 1:30 over the catalyst at temperatures of 320–420° C.

Where diluents rich in silica are used and particularly those described above, the diluted base exchange bodies are excellently suited for the oxidation of sulfur dioxide to sulfur trioxide, 6–8% burner gases being passed over the catalyst at 440–500° C.

Example 2.

A potassium vanadyl base exchange body is prepared as described in Example 1 and is then sprayed with 3–5% inorganic acids, such as, for example, sulfuric acid, phosphoric acid, nitric acid, or the like, until the potassium content of the base exchange-body has been neutralized and a so-called salt-like body is obtained. This salt-like body tends to oxidize toluol and the substituted toluols preferentially to the corresponding benzoic acids under the reaction conditions described in Example 1.

The salt-like body described above is also excellently suited for the oxidation of fluorene to fluorenone, naphthalene to alpha-naphthaquinone and phthalic anhydride, depending on the reaction conditions. The product is also useful as an insecticidal preparation when dried and pulverized. It may be applied either by dusting or in the form of a fine suspension in water. The insecticidal activity can be increased by impregnating the product with a 5% copper sulfate solution and then washing with a 5% sodium arsenate solution.

Example 3.

A base exchange body is prepared as described in Example 1, except that diluent bodies are omitted. The product thus produced is an excellent catalyst for the vapor phase oxidation of benzol to maleic acid and fumaric acid and methyl alcohol to formaldehyde. The undiluted salt-like body, prepared as described in Example 2, is also an excellent catalyst for the same reactions.

Example 4.

A potassium vanadyl base exchange body as described in the foregoing examples is coated onto massive carrier fragments, such as, for example, materials rich in silica, as quartz fragments, quartz filter stones, sand stones, fragments of silica gel, diatomaceous stones, fragments of celite, pumice fragments, asbestos fragments, fragments of natural or artificial silicates and diluted or undiluted zeolites, metals such as aluminum granules, metal alloys, ferrosilicon, ferrovanadium, ferrochrome and the like, particularly where their surface has been roughened. The coating can be either after formation or the product can be caused to react on the carrier fragments and be generated in situ. Artificial carrier fragments can also be prepared, for example, by forming fragments of celite, kieselguhr, pulverized quartz, pulverized silica gel, pulverized silicates and diluted or undiluted zeolites, using various adhesives, such as a waterglass, alkalies and alkali metal salts followed by calcination at 400–500° C. and treatment with acids. When the base exchange body or its salt-like body is coated onto the carrier fragments after it has been formed, various adhesives can be used which are stabilizers for the catalyst when used in the oxidation of organic compounds. Thus, for example, many acid and neutral salts of the alkali-forming metals, such as sulfates, phosphates, chlorides, nitrates, nitrites, waterglass and the like, can be used and in some cases the alkalies or alkaline earths themselves are effective. The catalyst, when not provided with too much stabilizer is excellent for the oxidation of sulfur dioxide.

Instead of introducing diluent bodies into the base exchange body during formation, as described in the foregoing examples, the undiluted base exchange body can be prepared from its components potassium vanadite and vanadyl sulfate, and then mixed mechanically in aqueous suspensions with the diluent bodies or the base exchange body may be dried and pulverized and then mixed with the latter. For example, 50 parts of celite may be used and the mixture formed into granules with any of the above described adhesives. An excellent catalyst is thus produced for the oxidation of xylenes, mesitylene, pseudocumene and paracymene to the corresponding aldehydes and acids.

Example 5.

20 parts of $V_2O_5$ are suspended in 500 parts of water as described in Example 1, acidified with a little concentrated sulfuric acid and reduced to vanadyl sulfate by means of gases containing $SO_2$. The blue solution obtained is treated with sufficient 2N potassium hydroxide solution to precipitate a voluminous brown precipitate of $V_2O_4$ which is then sucked and suspended in 200 parts of water. It is then gradually warmed to 60–70° C. and additional 2N potassium hydroxide solution is added until all of the $V_2O_4$ dissolves to form a coffee brown solution. This requires an excess of potassium hydroxide. The potassium vanadite thus produced is then stirred with 60 parts of infusorial earth and 2N sulfuric acid is gradually poured into the solution with vigorous agitation until the latter just remains alkaline to phenolphthalein. Instead of sulfuric acid, phosphoric acid may be used. The sulfuric acid brings down a brown precipitate while phosphoric acid brings down a brownish blue precipitate. The precipitates are pressed and then dried at temperatures below 100° C. The products thus obtained are saturated with a dilute waterglass solution formed of 110 parts of a 33° Bé. waterglass solution diluted with 100 parts of water. After impregnation, the product is again dried and broken into fragments and treated at 450–500° C. with 7% burner gases. In a short time, an excellent contact sulfuric acid process sets in.

Example 6.

A product is prepared as described in the foregoing example except that 180 parts of waterglass are used instead of 110. The catalyst thus produced is excellent for the oxidation of naphthalene to alphanaphthaquinone when a mixture of naphthalene vapors and air in the proportion of 1:35 by weight is passed over the contact mass at 370–400° C.

Example 7.

20 parts of $V_2O_5$ are reduced to a vanadyl sulfate solution as described in the foregoing examples and is diluted with 60 parts of infusorial earth. 2N potassium hydroxide solution is added in portions in the cold with vigorous agitation until the mixture just remains alkaline to phenolphthalein. The body precipitated is treated in the usual manner as described in the foregoing examples, and is an excellent catalyst for the oxidation of naphthalene to phthalic anhydride, when a naphthalene vapor and air mixture in the proportion of 1:20 is passed over the catalyst at 380–420° C.

Example 8.

Diluted base exchange bodies, as described in the foregoing examples, are prepared with diluents which have been impregnated with ferric oxide, silver oxide or copper oxide, the diluents being incorporated into the base exchange body during its formation. These products are then sprayed with sufficient normal sulfuric acid to form the so-called salt-like bodies and to completely neutralize the alkali content of the base exchange body. Such a contact mass containing 6–8% of ferric oxide is particularly effective for the oxidation of anthracene to anthraquinone at a temperature of 350–400° C. when a mixture of anthracene and air in a proportion of 1:40 is passed over the catalyst.

A contact mass as described above which contains about 4% silver oxide and 6% copper oxide instead of ferric oxide is excellently suited for the oxidation of methyl alcohol to formaldehyde at 370–390° C., the methyl alcohol vapors and air being passed over the catalyst in the proportion of 1:25 by weight.

Similar catalysts can be obtained by impregnating the diluents with ferric sulfate, silver nitrate or copper nitrate.

Example 9.

12 parts of vanadic acid are treated with sufficient 2N potassium hydroxide solution so that not only is all of the $V_2O_5$ dissolved in the form of potassium vanadate, but an excess of 14 parts of 100% KOH remains. A mixture of 120 parts of comminuted quartz and 20 parts of kieselguhr is impregnated with the above described solution. A second solution is prepared by reducing 10 parts of vanadic acid to vanadyl sulfate in the usual manner and neutralizing the excess sulfuric acid with 2N potassium hydroxide solution.

Solution 2 and suspension 1 are then kneaded together thoroughly and dried at temperatures of 100° C. The product is a base exchange body containing $K_2O$, $V_2O_5$ and $V_2O_4$. The product is broken into fragments and after preliminary treatment with 7% burner gases at 450–500° C. is an excellent catalyst for the oxidation of sulfur dioxide to sulfur trioxide.

Example 10.

Base exchange bodies are prepared by using potassium tungstate, potassium chromate, potassium molybdate or potassium tantalate in molecularly equivalent amounts instead of potassium vanadate as in Example 9. These catalysts are excellently suited for the oxidation of toluol to benzaldehyde and benzoic acid and substituted toluols to the corresponding aldehydes and acids when the vapors of the products, mixed with air therein the proportion of 1:35 by weight are passed over the contact masses at 340–390° C.

*Example 11.*

22 parts of basic copper carbonate are dissolved in the form of the cuprammonium compound. 10.2 parts of freshly precipitated aluminum hydroxide are dissolved up in sufficient 2N sodium hydroxide solution to form a clear sodium aluminate solution and finally 24 parts of copper nitrate containing three mols of water are dissolved in 100 parts of water. The cuprammonium carbonate and the sodium aluminate solutions are then mixed together and 100 parts of kieselguhr are introduced with vigorous agitation or 150 parts of quartz or pumice meal may be substituted therefor. The copper nitrate solution is then poured into the mixture with vigorous agitation and a gelatinous blue product forms which is neutral or slightly alkaline to phenolphthalein. The product is a base exchange body containing sodium, copper and aluminum and is diluted with materials rich in kieselguhr. The gel is pressed and dried at temperatures under 100° C. and then broken into fragments and reduced at 220–300° C. with gases containing hydrogen. There results an excellent catalyst for the reduction of aromatic nitro compounds to amines, thus, for example, nitrobenzol vapors mixed with hydrogen are almost quantitatively reduced to aniline at 180–260° C. In a similar manner, nitronaphthalene is reduced to the naphthylamine. The same contact mass can also be used for dehydrogenating cyclohexanol to cyclohexanone at 220–320° C. Similarly, borneol is transformed into camphor at 280–300° C. and acetaldehyde and crotonaldehyde can be reduced to the corresponding alcohols at 80–180° C.

The catalyst can also be used as a chlorine carrier, for example, in the production of chlorinated derivatives of methane or for the chlorination of impurities in aromatic hydrocarbons, such as, for example, the chlorination of thiophenes and alifatic hydrocarbons which are present as impurities in benzol and which can readily be separated from benzol after chlorination because of their greatly raised boiling point.

Instead of using the catalysts as described they may be coated onto fragments of pumice or quartz by means of a waterglass solution and can then be used effectively as catalysts after reduction with the gases containing hydrogen. In this manner, a considerable quantity of the catalyst may be saved.

*Example 12.*

The following solutions are prepared:
1. 30 parts of nickel nitrate containing 6 mols of water crystallization are dissolved in 200 parts of water and sufficient 25% ammonia is added until a clear solution of the nickel ammonium nitrate is obtained.
2. 4 parts of freshly precipitated aluminum hydroxide are stirred into a slurry with 50 parts of water and are then treated with a sufficient 10N sodium hydroxide solution to just form a clear solution of sodium aluminate.
3. 10 parts of chromium nitrate with 9 mols of water crystallization are dissolved in 150 parts of water and then also treated with 10N sodium hydroxide solution until sodium chromite is formed.
4. 8 parts of zinc nitrate containing 6 mols of water of crystallization are dissolved in 50 parts of water and treated with just sufficient 10N sodium hydroxide to form sodium zincate.
5. 40 parts of nickel nitrate with 6 mols of water crystallization are dissolved in 200 parts of water.
6. 11 parts of zirconium nitrate with 5 mols of water of crystallization are dissolved in 150 parts of water.
7. 16 parts of titanium nitrate are dissolved in 160 parts of water.

Solutions 1, 2, 3 and 4 are mixed together and 300 parts of kieselguhr, pumice meal or activated carbon, or a mixture stirred in. Instead of these diluents, sulfur-free pulverized nickel ore may be used. To the suspension, a mixture of the solutions of 5, 6 and 7 are added with vigorous agitation. A gelatinous reaction product forms and if it is strongly alkaline to phenolphthalein, the excess alkali may be neutralized with 5% nitric acid until just neutral to phenolphthalein, whereby the yield of the base exchange body can be increased. For certain purposes, very weak alkalinity is sufficient, but the neutral point to litmus should never be exceeded, as then the physical structure of the reaction product is changed and the base exchange powers greatly diminished or entirely destroyed.

The product is dried at temperatures below 100° C. and is a base exchange body containing sodium, ammonium, nickel, aluminum, chormium, zinc, zirconium and titanium. When broken into fragments, it can be used for many purposes. Thus, for example, when reduced with hydrogen at 300° C., an excellent hydrogenation catalyst is produced for liquid or gaseous reactions. For example, vapors of acetone and other ketones mixed with hydrogen can be reduced thereby to the corresponding alcohols at 100–120° C. Phenol is hydrogenated to form cyclohexanol at 220–260° C. Naphthalene is reduced to tetraline at 180–220° C. and finally acetaldehyde can be reduced to ethyl alcohol at 200° C.

The base exchange bodies can be pulverized, reduced to hydrogen at 300° C. and then constitute excellent catalysts for the hardening of fats and for the reduction of nitro bodies, ketones, phenols, aldehydes and hydrocarbons in a liquid state, particularly when the reducing agent consists in gases containing hydrogen used at an elevated pressure. Hydrogenations and reductions in liquid phase by means of hydrogen can also be carried out by coating the pulverized base exchange bodies onto granular carriers such as pumice, diatomaceous stones, earthenware fragments, metal bodies, such as aluminum granules, and the like, by means of waterglass or sulfur-free organic adhesives. The catalysts are then used by causing the substances to be reduced in liquid or molten state to trickle over the catalysts in counter-current to a stream of hydrogen.

Example 13.

66 parts of crystallized aluminum sulfate containing 18 parts of water of crystallization are dissolved in 200 parts of water and a 10N sodium hydroxide solution is added until all of the aluminum is transformed into sodium aluminate. A second 66 parts of aluminum sulfate are then dissolved in 100 parts of water. Diluent bodies, such as rocks, tuffs or trass of volcanic origin, greensand, coke, charcoal, activated carbon, kieselguhr or manangese dioxide are stirred into solution #1 until the suspension just remains readily stirrable. The mixture is heated up to about 80° C. and the aluminum sulfate solution is gradually added with vigorous agitation, care being taken that even after adding the whole of the aluminum sulfate solution, the alkalinity of the mixture remains between the turning points of phenolphthalein and methyl orange. This necessitates usually a small excess of alkali in the aluminate solution and the amount of the excess can easily be determined by a small test experiment.

If the reaction product is strongly alkaline to phenolphthalein, the alkalinity can be descreased by the addition of sulfuric or hydrochloric acid of 3–5% strength. A base exchange body containing aluminum is obtained and is freed from its mother liquor by pressing and dried at temperatures under 100° C. After hydrating with water, the product is an excellent water softening body. The metallate component can be substituted partly or wholly by metallates of one or more amphoteric metals such as zinc, lead, chromium, tin and the like. The aluminum sulfate can also be substituted partly or wholly by one or more heavy metal salts such as, for example, salts of zinc, lead, zirconium, tin, iron, nickel, cobalt, copper, titanium, manganese and chromium.

These substituted products may be used for the softening of water and also as carriers for catalysts; particularly they are suitable as carriers or catalysts in reactions which involve the splitting off of water.

Example 14.

90 parts of zinc nitrate containing 6 mols of water of crystallization are dissolved in 1500 parts of water and sufficient concentrated ammonia (25%) is added to transform the zinc into an ammonium complex salt. 16 parts of chromium oxide are then prepared by adding ammonia to a corresponding quantity of 10% chrome nitrate solution until the chromium trioxide is precipitated in finely divided form. The precipitated chromium is then thoroughly washed with water and stirred up in 150 parts of water to form a slurry. A third solution of 48 parts of copper nitrate containing 3 mols of water of crystallization in 280 parts of water is prepared and the chromium oxide suspension is then stirred into the dilute copper nitrate solution and the combined mixture then poured into the zinc solution with vigorous agitation, care being taken that the reaction mixture remains ammoniacal.

A gel forms which is sucked and dried at 80° C. forming hard vitreous fragments which constitute base exchange bodies containing ammonium zinc and copper and are permeated with chromium oxide in fine state of division. These products are valuable catalysts for the preparation of methanol by the catalytic reduction of oxides of carbon and formaldehyde. Instead of introducing the copper in the form of copper nitrate a cuprammonium complex similar to the zinc ammonium complex can be used. The copper nitrate may also be substituted by cadmium nitrate in part or in whole.

The chromium oxide may be substituted by salts of chromic acid such as, for example, copper chromate, cadmium chromate or aluminum chromate and $V_2O_5$, $WO_3$, $UO_3$ or salts can also be used. A further diluent body is lead dioxide.

The products produced according to the present example can be used in the reduction of carbon monoxide in a circulatory process; a mixture of carbon monoxide and hydrogen, the latter in excess at pressures from 50 to 200 atmospheres is passed over the catalyst at 300–400° C. The reducing power of the catalyst is sufficiently decreased so that methyl alcohol is preferentially produced, together with higher alcohols and ketones.

The products of the present example can also be utilized effectively for the production of methyl alcohol from carbon dioxide at 250–350° C. if magnesium is introduced by base exchange, for example, by treating the body for a short time with a 10% magnesium nitrate solution and then reducing the catalyst at 200° C. by means of gases containing hydrogen.

*Example 15.*

60 parts of zinc nitrate containing 6 mols of water are dissolved in 200 parts of water and sufficient 10N sodium hydroxide solution is added until the zinc hydroxide which at first precipitates is dissolved in the form of the zincate. 12 parts of basic copper carbonate are then stirred up with 150 parts of water to form a slurry and sufficient ammonia is added to dissolve the copper as cuprammonium carbonate. A little ammonia is then added to the zincate solution and the cuprammonium carbonate solution added. To this mixture 100 to 150 parts of quartz, asbestos, manganese dioxide or a mixture are added as diluents. 30 parts of chromium nitrate containing 6 mols of water are dissolved in 300 parts of water and 48 parts of cadmium nitrate containing 4 mols of water are dissolved in 500 parts of water. The two solutions are then mixed and are poured into the suspension above described, care being taken that the mixture remains alkaline or neutral to phenolphthalein.

A gelatinous mass is obtained and is pressed and dried cautiously at temperatures below 100° C., whereupon it is then treated for a considerable time with hydrogen containing gases at 200° C. The base exchange body contains zinc, copper, chromium and cadmium diluted with quartz, asbestos and manganese dioxide or mixtures, and is an excellent contact mass for the reduction of oxides of carbon with hydrogen at 250–400° C. at high pressure and if necessary in a circulatory process to produce higher alifatic alcohols and ketones in addition to methyl alcohol.

If the contact mass described in this example is arranged ahead of the contact mass described in the foregoing example so that the two catalysts are arranged in layers and the alkaline catalyst of Example 14 is the last one through which the gases pass, oils are obtained which are very rich in ketones.

*Example 16.*

A mixture is formed of the following three solutions:

30 parts of zinc nitrate containing 6 mols of water dissolved in 100 parts of water are transformed into potassium zincate by means of 10N potassium hydroxide solution; 15 parts of cadmium nitrate with 4 mols of water dissolved in 200 parts of water are also transformed into potassium cadmiate by means of 10N potassium hydroxide solution; 10 parts of aluminum oxide freshly precipitated from an aluminum nitrate solution by means of ammonia and transformed into sodium aluminate with 2N sodium hydroxide solution. Asbestos powder or pumice meal is added to this mixture until the resulting product just remains easily stirrable. To this suspension a solution of 45 parts of ferric nitrate containing 9 mols of water and dissolved in 450 parts of water is added in a thin stream.

The reaction product is a base exchange body containing potassium, sodium, zinc, aluminum, cadmium and iron. When pressed and dried under 100° C. and reduced at 300° C. in a stream of hydrogen the product is an excellent reduction catalyst to produce liquid reduction products from purified water gas with or without high pressure, the reaction taking place at about 300–450° C. The reduction products resemble mineral oils and are well suited for synthetic motor fuels.

When the synthesis is to be carried out without pressure catalysts described in Examples 14 and 15 can advantageously be arranged in thin layers ahead of the catalyst described in the present example. The alcohols and ketones produced by the first catalyst are thus condensed by the catalyst of the present example to hydro-carbons of petroleum-like character. An intimate mixture of the three types of catalysts is also advantageous in many cases.

*Example 17.*

The following four mixtures are prepared:

1. 5 parts of aluminum oxide are dissolved in a minimum of concentrated 5N sodium hydroxide solution to form sodium aluminate.

2. 14 parts of zinc nitrate containing 6 mols of water are dissolved in 100 parts of water and sufficient 10N sodium hydroxide solution added to dissolve the zinc as sodium zincate.

3. 18 parts of chromium nitrate containing 9 mols of water are dissolved in 200 parts of hot water.

4. 18 parts of thorium nitrate containing 12 mols of water are dissolved in 100 parts of water.

Solutions 1 and 2 are poured together and 250 parts of pulverized iron spar are kneaded in vigorously, whereupon solutions 3 and 4 are added and also vigorously kneaded in. The reaction mixture formed is sucked, pressed and dried at temperatures of 150° C. The cake formed is then broken up and constitutes a base exchange body containing sodium, aluminum, zinc, chromium and thorium, which acts as an adhesive and a porous skeleton for the pulverized iron ore.

The product thus produced is an excellent contact mass, as the base exchange body which forms its skeleton has very desirable adsorptive and absorptive power. The product can be used with excellent effect as a catalyst for the water gas process in which steam and carbon monoxide are transformed into carbon dioxide and hydrogen. Purified or unpurified water gas, together with a slight excess of steam are passed over the contact mass at 400–600° C.

Example 18.

The following mixtures are prepared:

1. Freshly precipitated iron oxide is prepared by adding 5 to 6% ammonia to a 10 to 15% ferrous nitrate solution at 40–50° C. until the reaction is ammoniacal. Finely divided iron oxide is then carefully washed in distilled water to remove the ammonium nitrate and dried at temperatures below 100° C.

2. 24 parts of lead dioxide in the form of sodium plumbite are dissolved in water to form a 10% solution.

3. 5 parts of freshly precipitated aluminum oxide are dissolved up in 2N potassium hydroxide to form potassium aluminate.

4. 18 parts of thorium nitrate containing 12 mols of water are dissolved in 100 parts of water.

5. 25 parts of copper nitrate containing 3 mols of water are dissolved in 100 parts of water.

The freshly precipitated iron oxide is suspended into the plumbite and aluminate solutions and then the thorium nitrate and copper nitrate solutions added. The reaction product obtained is thoroughly pressed and dried at 80–90° C. followed by fragmentation.

The product is a catalyst containing potassium, sodium, thorium and copper, greatly diluted with freshly precipitated iron oxide and is excellently suited for the oxidation of ammonia to oxides of nitrogen at temperatures from 500–600° C. by means of oxygen containing gases. The base exchange body surrounding the iron oxide by reason of its chemical and physical characteristics may be considered both as an adhesive and as a promoter which enhances the catalytic activity of the iron oxide.

Example 19.

1000 parts of freshly precipitated iron oxide are suspended in 300 parts of water to form a slurry. 15 parts of freshly precipitated aluminum oxide are dissolved in 2N potassium hydroxide to form potassium aluminate and 10% of alkali is permitted to remain. The iron oxide is then stirred in and finally 40 parts of zirconium nitrate containing 5 mols of water dissolved to form a 5% solution are added to the aluminate and iron oxide suspension, care being taken that the final mixture remains alkaline to phenolphthalein. The product is sucked and the press cake dried at temperatures below 100° C. followed by fragmentation.

The resulting mass containing iron oxide impregnated with a base exchange body containing potassium aluminum zirconium is an excellent catalyst for the synthesis of ammonia, the uniformly distributed base exchange body acting as a promoter of the activity of the iron oxide due to the presence of aluminum and zirconium oxides and acting also as a stabilizer because of the presence of potassium. In addition to these two important characteristics the physical structure of the base exchange body is very desirable for catalytic purposes and maintains their adsorptive and absorptive powers for nitrogen and hydrogen even at high temperatures. The durability of the catalyst is very considerable even at temperatures at which the ammonia synthesis is carried out and is therefore very effective over long periods of time.

An excellent yield of ammonia is obtained when the catalyst is treated for a short time at 400–600° C. with a mixture of hydrogen and nitrogen and then a mixture of hydrogen and nitrogen in the proportion of 3 to 1 is passed over it at 50–250 atmospheres at a temperature of 400–600° C.

Example 20.

Effective catalysts for the ammonia synthesis of a composition similar to Example 19 can be prepared by a fusion process. 15 parts of aluminum oxide, 11.5 parts of zirconium oxide and 18 parts of anhydrous potassium carbonate are ground together and intimately mixed with 100 parts of iron oxide, particularly magnetic iron oxide, or with a corresponding amount of pulverized iron. The mixture is then fused and produces a catalyst in which the iron oxide is impregnated with a base exchange body containing potassium aluminum and zirconium and which can be used for the synthesis of ammonia under the conditions described in Example 19.

Instead of carrying out the fusion as described, an intimate mixture of iron oxide and the components of the base exchange body can be introduced into a tower and a hot gaseous mixture of air and organic substances having preferably a temperature of 400–500° C. is passed over the mixture. A catalytic oxidation process takes place in which the organic substances are completely burned by the air and the impurities removed while the heat which is evolved in the exothermic reaction causes the components of the catalysts to sinter together or completely melt. The sintered or melted material contains the base exchange body in a nascent state and is an excellent catalyst for the synthesis of ammonia. Iron can be substituted for the iron oxide and the mixture of iron and the components of the base exchange bodies can be ignited in the so-called Schopp-Meurer spray gun. The resulting sintered material in which the base exchange body is uniformly formed is highly effective for the synthesis of ammonia.

*Example 21.*

10 parts of aluminum hydroxide are dissolved in 2N potassium hydroxide solution to form potassium aluminate, as described in the foregoing examples. 40 parts of chromium nitrate containing 9 mols of water are dissolved in 300 parts of water and transformed into a potassium chromite solution with 10N potassium hydroxide solution. 70 parts of thorium nitrate containing 12 mols of water are dissolved in 200 parts of water. The chromite and aluminate solutions are mixed together and coke, activated carbon or silica gel are stirred in until the mixture just remains readily stirrable. The thorium nitrate solution is then poured in, care being taken that the whole mixture remains neutral or alkaline to phenolphthalein. The product is sucked, dried below 100° C., hydrated for a short time and then the alkali exchanged for calcium by digesting with a 5% calcium nitrate solution. After the base exchange is complete the product is carefully washed and given a subsequent treatment with 2% vanadate solution forming with the vanadate a so-called salt-like body.

The product thus obtained is an excellent catalyst for the synthesis of hydrocyanic acid from ammonia and carbon monoxide. The water formed in this synthesis may be easily removed by adding to the catalyst a water gas catalyst such as is described in Example 17.

*Example 22.*

80 parts of chromium nitrate containing 9 mols of water are dissolved in 100 parts of water and transformed into a potassium chromite solution with a 10N hydroxide solution. The alkalinity is then reduced by a 5% nitric acid solution which is added with vigorous agitation until the mixture remains slightly alkaline or neutral to phenolphthalein. A gelatinous suspension is formed which is mixed with 500 volumes of lignite, coke or silica gel if desired with the addition of maganese dioxide, dried while being stirred in order to prevent the mass from sticking together, the temperature being maintained below 100° C. After drying the mass is hydrated with 500 parts of luke warm water by permitting the water to slowly drip through the mass. After hydrating the product is again dried.

The resulting body in which the lignite, coke or hydrated silicic acid act as a carrier and in which the potassium chrome base exchange body is impregnated, is excellently suited as a gas purifying mass for the removal of combined sulfur from gases, the gases being passed over the contact at 400–450° C. The effectiveness of the catalyst for gas purification may frequently be enhanced by digesting with ammonium salts in order to effect base exchange.

*Example 23.*

67 parts of aluminum sulfate containing 18 mols of water are dissolved in 200 parts of water, 30 parts of zinc nitrate containing 6 mols of water are dissolved in 150 parts of water, and 24 parts of copper nitrate containing 3 mols of water are also dissolved in 150 parts of water. The three solutions are mixed together and 500 parts of finely ground calcium arsenate are stirred in. 2N sodium hydroxide solution is then stirred into the suspension until the reaction mixture becomes alkaline to phenolphthalein. The product is then sucked and dried at temperatures below 100° C. followed by hydrating with 5 times its volume of water at 40–50° C. The body is then digested with 5% mercury chloride solution until the sodium is substituted by mercury as far as possible. The body is again dried and constitutes a mercury aluminum zinc base exchange body diluted with calcium arsenate and copper oxide. This product is then mixed with 10% of its weight of finely pulverized sodium chloride and is an excellent insecticide. When it is sprayed on plants the moisture of the dew gradually causes the mercury to be exchanged by sodium from the sodium chloride and continuously and gradually gives off its insecticidal component.

*Example 24.*

A concentrated solution of sodium aluminate is prepared by dissolving 10 parts of aluminum oxide in 5N sodium hydroxide solution and 40 parts of ferric nitrate containing 9 mols of water is dissolved in 200 parts of water. 500 parts of ferric oxide are kneaded into the aluminate solution after incorporating 50 parts of monazite sand refuse. The iron nitrate solution is then added in small portions with vigorous agitation, and the product then pressed, dried under 100° C., broken into fragments and calcined. The mass thus obtained is a sodium aluminum iron base exchange body intimately diluted with ferric oxide and monazite sand and is an excellent catalyst for flameless combustion, the so-called surface combustion. The fuel gases mixed with gases containing oxygen are passed over the contact mass at 350–450° C.

*Example 25.*

18 parts of vanadium pentoxide are suspended in 300 parts of water rendered weakly acid with concentrated sulfuric acid and reduced with sulfur dioxide to blue vanadyl sulfate in the usual manner. The solution is boiled and concentrated to 150 parts of water. 10 parts of aluminum oxide are transformed into potassium aluminate with 5N potassium hydroxide solution. ⅓ of the vanadyl sulfate solution is treated with 10N potassium hydroxide solution to transform it into the coffee-brown potassium vanadite which is then mixed with the potassium aluminate solution and 100 parts of infusorial earth added. Thereupon the remaining ⅔ of the vanadyl sulfate solution is added with vigorous agitation. The final reaction product should remain strongly alkaline to litmus.

The product is pressed, dried as usual under 100° C., broken into the fragments and then sprayed with 10% sulfuric acid until the so-called salt-like body is formed with the potassium vanadyl aluminum base exchange body which is diluted with infusorial earth. During the spraying the fragments should preferably be heated and stirred.

The product obtained after treatment with air at 400° C. is an excellent catalyst for the vapor phase oxidation of naphthalene to phthalic anhydride when a mixture of naphthalene vapors and air in the proportion of 1 to 18 by weight is passed over the catalyst at 380–410° C.

*Example 26.*

A base exchange body is prepared as described in Example 25 but instead of causing it to react with sulfuric acid to form a salt-like body, it is digested for a considerable period of time with a 5% copper nitrate solution whereby part of the alkali is substituted by copper. The product thus obtained is an excellent catalyst for the oxidation of methyl alcohol to formaldehyde in the vapor phase at 360–400° C. A mixture of gaseous methyl alcohol and air in the proportion of 1 to 10 are passed over the catalyst.

*Example 27.*

A base exchange body is prepared as described in Example 26 but instead of digesting with copper nitrate a 5% solution of ferric nitrate is used in order to substitute as much as possible of the alkali by ferric oxide. The product thus obtained is an excellent catalyst for the catalytic purification of coal tar ammonia, the ammonia vapors mixed with air at 360–450° being passed over the catalyst whereby the organic impurities are oxidized to carbon dioxide and water with the production of some elementary nitrogen.

*Example 28.*

A base exchange body is prepared as described in Example 25 but instead of using 10 parts of aluminum oxide, 20 parts of aluminum oxide and a corresponding amount of potassium hydroxide is used, the potassium aluminate solution being diluted with 60–70 parts of kieselguhr, pumice fragments or quartz fragments, and the alkali base exchange body being neutralized with sulfuric acid to form a salt-like body. The product thus obtained is an excellent catalyst for the catalytic oxidation of benzol, toluol, phenol and tar acids to maleic acid. The gaseous mixture of these aromatic hydrocarbons or compounds and air in the proportion of 1 to 20 are passed over the catalyst at 360–450° C.

*Example 29.*

Four mixtures are prepared as follows:
1. 19 parts of beryllium nitrate containing 3 mols of water are dissolved in 100 parts of hot water and sufficient 5N sodium hydroxide solution is added to form the sodium beryllate.
2. 30 parts of zinc nitrate containing 6 mols of water are dissolved in 100 parts of water and also transformed into the zincate by means of 5N sodium hydroxide.
3. 5.5 parts of thorium nitrate containing 12 mols of water are dissolved in 200 parts of water.
4. 25 parts of zirconium nitrate containing 5 mols of water are dissolved in 250 parts of water.

Solutions 1 and 2 are poured together and pulverized unglazed porcelain is added until the suspension just remains easily stirrable. Thereupon a mixture of solutions of 3 and 4 is added, taking care that the reaction mixture shall remain alkaline to phenolphthalein.

The body obtained is a sodium beryllium zinc thorium zirconium base exchange body containing unglazed porcelain as a diluent, and is an excellent catalyst for the so-called aldolizations and crotonizations. When acetaldehyde vapors are passed through a thick layer of this catalyst at elevated temperatures they are transformed into aldol or crotonaldehyde, depending on the reaction conditions. The latter can be used as a raw material for the reduction to normal butyl alcohol by means of hydrogen and copper reduction catalyst, such as those described in Example 11.

*Example 30.*

60–80 parts of kieselguhr are impregnated with an ammonical silver vanadate solution prepared by causing a reaction between 18 parts of $V_2O_5$ in the form of sodium metavanadate dissolved in 250 parts of water with 34 parts of silver nitrate also dissolved in 250 parts of water. The yellow silver vanadate which is precipitated is then separated from the mother liquor in the usual manner and suspended in 100–150 parts of water in the form of a slurry. 20% ammonia water is added until all of the silver vanadate dissolves. After impregnation the kieselguhr is warmed to completely drive off the ammonia.

10.2 parts of freshly precipitated aluminum oxide are dissolved up with about 40 parts of 100% KOH in 300 parts of water to form the potassium aluminate and 57 parts of ferric sulfate with 9 mols of water of crystallization are dissolved in 52 parts of water. The aluminate solution is mixed with the impregnated kieselguhr and thereupon the ferric sulfate solution is poured in with vigorous agitation, forming a base exchange body containing impregnated kieselguhr as a diluent. The precipitate is pressed, washed with 200 parts of water in small portions, dried in the usual way at temperatures below 100° C. and broken into fragments. These fragments are calcined and then form an excellent contact mass for the catalytic oxidation of sulfur dioxide, yielding up to 98% of the theoretical yield, starting with 6–9% burner gases, the reaction being carried out between 420–450° C.

The aluminum-iron base exchange body is not itself a catalyst for the production of $SO_3$ but the silver vanadate introduced in the form of a diluent transforms the base exchange body into an excellent catalyst.

The aluminate used can be substituted by other metallates such as, for example, potassium beryllate and in the same way the iron sulfate can be replaced by other metal salts such as zirconium sulfate, copper sulfate, cobalt sulfate, nickel sulfate, and the like.

The silver vanadate which is the catalytically effective component, can be replaced partly or wholly by other salts of tetravalent and pentavalent vanadium such as, for example, copper vanadate, iron vanadate, manganese vanadate or calcium vanadate. The vanadates may also be produced in the acid salt component solution, in this case the iron sulfate solution, by adding to it suitable amounts of salts capable of forming the vanadate such as, for example, iron sulfate, copper sulfate, silver nitrate, or the like, the amount of excess salt being equivalent to the 18.2 parts of $V_2O_5$ which are added in the form of the alkali metal metavanadate.

*Example 31.*

14 parts of $V_2O_5$ are suspended in 250 parts of water to form a slurry, acidified with 5 parts of concentrated sulfuric acid and then reduced to the blue vanadyl sulfate in the usual manner by means of gases containing $SO_2$ which are passed into the solution at the boiling temperature. 125 parts of waterglass solution of 33° Bé. are then diluted with 200 parts of water and about 40 parts of celite stirred in. The waterglass solution is then poured into the vanadyl sulfate solution with vigorous agitation, precipitating out vanadyl silicate. Care should be taken that after all of the solutions have reacted, the resulting mixture is neutral to litmus.

10 parts of freshly precipitated aluminum oxide are treated with sufficient ½N KOH solution to dissolve up the aluminum oxide in the form of potassium aluminate and to provide a 10% excess of KOH. 37 parts of ferric sulfate containing 9 mols of water of crystallization are dissolved in 250–300 parts of water. Into the aluminate solution is then stirred the vanadyl silicate diluted with celite and thereupon the ferric sulfate solution is added, producing a base exchange body in which the vanadyl silicate is homogeneously incorporated as a diluent. The reaction product is treated in the usual way by pressing and drying below 100° C. and is broken into fragments. These fragments are calcined with air at 400° C. and then with 6–8% burner gases at 420–500° C., producing in a short time an excellent contact sulfuric acid catalyst. The catalyst may also be used for the oxidation of anthracene to anthraquinone and acenaphthene to naphthalic anhydride when these aromatic hydrocarbons are passed over the catalyst in the vapor phase mixed with air in the proportion of from 1:30 to 1:40, the temperature being maintained at about 360–420° C.

*Example 32.*

A product is produced by a process such as that described in the foregoing example, but the ferric sulfate solution is substituted partially or wholly by equivalent amounts of copper sulfate solution or silver nitrate solution or a mixture of the two. The contact masses thus produced are excellently suited for the catalytic oxidation of benzol to maleic acid and methyl alcohol to formaldehyde under reaction conditions described in Example 31.

*Example 33.*

A vanadyl base exchange body is prepared by suspending 20 parts of $V_2O_5$ in 500 parts of water, adding a little concentrated sulfuric acid and then reducing the $V_2O_5$ with gases containing sulfur dioxide at the boiling point until it is completely transformed to blue vanadyl sulfate. The vanadyl sulfate solution is then divided into two equal parts, one of which is treated at 50-60° C. with sufficient 5N KOH to form a clear coffee-brown solution of potassium vanadite, to which 50 parts of celite earth is added as a diluent, the second half of the original solution being added with vigorous agitation, care being taken that the alkalinity remains between phenolphthalein red and litmus blue. The gelatinous product is sucked but not dried and constitutes a vanadyl base exchange body.

10.2 parts of freshly precipitated aluminum oxide are brought into solution with 40 parts of 100% KOH in 200 parts of water. The vanadyl base exchange body described above is then stirred into the solution and a 10% aqueous solution containing 37 parts of ferric sulfate with 9 mols of water or 44.4 parts of aluminum sulfate with 18 mols of water or a mixture of the two, is added to the aluminate mixture with vigorous agitation. The reaction product produced, which is an aluminum iron base exchange body and which does not possess any catalytic properties for the catalytic oxidation of sulfur dioxide or for the catalytic oxidation of organic compounds, is diluted with the catalytically active vanadyl base exchange body and is thereby transformed into a highly active contact mass for the above referred to processes. The reaction product is sucked, pressed, washed with 300-400 parts of water, dried and broken into fragments. The fragments may be treated with 5% copper sulfate, silver nitrate, cobalt nitrate or iron nitrate solutions to partly replace the alkali with these metals. The product may also be treated with salts of the metal oxygen acids of the fifth and sixth group, preferably with a 1% ammonium vanadate solution, resulting in a so-called salt-like body after the soluble components have been washed out.

The products are calcined with air or gases containing carbon dioxide at 400° C., the calcination temperature being permitted to rise gradually in order to prevent undesirable changes in the structure of the base exchange body. After this preliminary calcination the product is then treated with 3-7% burner gases at 400° C. and is transformed into a contact mass for the contact sulfuric acid process which may be carried out at temperatures of from 420-500° C.

The same catalyst is well suited for the catalytic oxidation of organic compounds, such as naphthalene to phthalic anhydride and maleic acid, anthracene to anthraquinone, acenaphthene to naphthalic anhydride, toluol and its substitution products to the corresponding benzaldehydes or benzoic acids, or methyl alcohol to formaldehyde. The vapors of the organic compounds mixed with air or other oxygen containing gases, such as, for example, $CO_2$ and oxygen, in the proportion of from 1 part organic compound to 20 to 30 parts of air are passed over the catalyst at 350-420° C.

In this example the aluminum-iron base exchange body may be considered as a complex stabilizer for the catalyst in these reactions. In order to promote or tune the stabilizing action of the catalyst, various stabilizer promoters can be added in the form of silicates or heavy metal oxides such as ferric oxide, copper oxide, titanium dioxide, manganese dioxide, zirconium dioxide, cerium dioxide, beryllium oxide, calcium oxide, cobalt oxide or thorium dioxide. They may be added singly or in mixtures and may advantageously be formed in a nascent state. The amount of the stabilizer promoter added depends on the effect desired; in general from, 2-5% of such stabilizer promoters gives good results. These stabilizer promoters, of course, may be added in the same manner as any other diluent as has been generally described in the introductory portion of this application.

A different method of introducing the stabilizer promoters consists in substituting part or all of the metal salt components of the base exchange body with corresponding amounts of beryllium sulfate, silver nitrate, nickel sulfate, cadmium sulfate or similar mineral acid salts of these bases.

In many cases it is desirable to neutralize excess alkali in the reaction products with 5% mineral acid such as hydrochloric acid, sulfuric acid, nitric acid or the like until the alkalinity has been brought to the desired point. Other catalytically active base exchange bodies, may, of course, be introduced as diluents instead of the one described.

*Example 34.*

Base exchange bodies of the present invention may also be made with zeolites as diluents, the zeolites being catalytically active. For example, 18 parts of $V_2O_5$ are acidified with a little concentrated sulfuric acid suspended in 250 parts of water, reduced with gases containing sulfur dioxide in the usual manner at an elevated temperature to form a vanadyl sulfate solution which is then treated with 5N KOH to form a clear coffee-brown potassium vanadite solution. 24 parts of $SiO_2$ in the form of 33° Bé. potassium waterglass are dissolved with 4-5 volumes of water and 50 parts of diatomite brick refuse or commercial, activated silicic acid are stirred in. The solutions are then poured together, heated to 65-75° C. and 5% hydrochloric or sulfuric acid is cautiously added until the whole mass solidifies to a gel, which is then pressed and washed with 200-300 parts of water.

Instead of transforming all of the vanadyl sulfate into potassium vanadite a third only may be so transformed and added to the waterglass solution, and the remaining two-thirds of the vanadyl sulfate added thereto, forming a so-called three-component vanadyl zeolite which is separated from the mother liquor in the usual manner.

A vanadium zeolite can also be prepared by dissolving 18 parts of $V_2O_5$ in N KOH to form the potassium metavanadate and then causing it to react with the diluted waterglass solution which contains the diatomite brick refuse. The reaction can be effected by mixing the two components at 60–80° C. and gradually adding 5% hydrochloric acid until the whole solidifies to a gel. The zeolite thus obtained is then purified in the usual manner.

Any of the catalytically effective zeolites in the foregoing three paragraphs can be incorporated into an aluminum-iron base exchange body, as described in Example 33, by incorporating it with one or other of the reaction components in the usual manner. If desired 2–5% of a stabilizer promoter described in the foregoing example can be formed in situ in order to get a still finer tuning of the catalytic activity.

The contact masses obtained after suitable purification and calcination are excellently suited for a contact sulfuric acid process operating with 6–9% burner gases at 400–480° C. By a suitable proportioning of the stabilizer and stabilizer promoters the contact mass can be adapted for the oxidation of organic compounds such as, for example, anthracene to anthraquinone, when the vapors of the former mixed with air in the proportion of 1:40 by weight are passed over the contact mass at 360–420° C.

*Example 35.*

20 parts of 33° Bé. sodium waterglass solution are diluted with 10 volumes of water and sufficient 5% iron sulfate, copper sulfate or silver nitrate solution is added to bring about a neutral reaction to litmus. The precipitate is sucked and thoroughly washed in water and constitutes silicates of the metals used which can be further worked up without drying. 16 parts of $V_2O_5$ are treated with sufficient ½N KOH at an elevated temperature to dissolve the $V_2O_5$ to potassium metavanadate. To this solution is added 40 parts of 100% KOH dissolved in 200 parts of water and 60 parts of infusorial earth or twice as much quartz or pulverized silicate rock are stirred in. The iron, copper, or silver silicates described above are then also stirred in to produce a uniform distribution. 66 parts of aluminum sulfate with 18 mols of water or an equivalent amount of beryllium sulfate or cadmium sulfate are dissolved in 250 parts of water and the solution is gradually poured into the suspension at 40–60° C. If necessary, 2½–5% sulfuric acid can be added to bring the reaction to the desired alkalinity or neutrality to phenolphthalein in order to get the maximum yield. The reaction product produced is then pressed and washed with 300 parts of water.

A product is obtained which is an aluminum base exchange body in which the $V_2O_5$ is present partly in chemically combined form and which product also contains as diluents the heavy metal silicate which may be considered as a stabilizer promoter to tone down the composite stabilizer formed by the aluminum base exchange body. The contact mass is dried below 100° C. in the usual manner, broken into fragments and then calcined with air at 400° C. and constitutes an effective catalyst for the contact sulfuric acid process after it has received a preliminary treatment with gases containing 2–3% of $SO_2$ at temperatures of about 400° C. The contact mass may be used with 7–9% burner gases at working temperatures of 420–480° C.

By suitably varying the amount of washing a catalyst can be produced which is effective for the catalytic oxidation of organic compounds, particularly for the vapor phase oxidation of ortho- and parachlortoluol to the corresponding benzoic acids. The washing, of course, affects the amount of alkali present and correspondingly the amount of alkali sulfate formed during the preliminary treatment. The alkali sulfate, of course, is one of the most effective stabilizers and the activity of the catalyst can be varied by varying the percentages of the stabilizer which is permitted to remain in the contact mass.

*Example 36.*

15 parts of $V_2O_5$ are dissolved in ½N KOH solution in the form of potassium metavanadate. 5 parts of freshly precipitated aluminum oxide are dissolved up in 35–40 parts of 100% KOH dissolved in 250 parts of water forming a potassium aluminate solution. The two solutions are poured together and a mixture of 20 parts of $TiO_2$ and 50 parts of kieselguhr are stirred in. Thereupon 17 parts of aluminum sulfate with 18 mols of water mixed with 20 parts of ferric sulfate having 9 mols of water are dissolved in about 300 parts of water and the solution is then gradually poured into the aluminum vanadate suspension at temperatures of about 50–60° C. 5% sulfuric acid is then gradually added until the desired alkalinity or neutrality to phenolphthalein is obtained. The reaction product produced is a vanadium aluminum iron base exchange body which contains as a diluent, titanium oxide and kieselguhr. The product is freed from the mother liquor in the usual manner, washed with three or four times its weight of water and then dried at a temperature under 100° C. The product is then broken into fragments and is an excellent catalyst for the sulfuric acid process and also for the catalytic oxidation of organic compounds. Under the usual reaction conditions, as has been described in the foregoing examples, part of the base exchange body components may be considered as stabilizers for the catalytically effective components and the titanium dioxide appears to act as a promoter for these stabilizers. The contact mass can also be treated with water after drying in order to hydrate it and then calcined before use.

Example 37.

A potassium vanadate solution is prepared by transforming 15 parts of $V_2O_5$ into the potassium metavanadate with ½N KOH and then diluting with 400 parts of water. 20 parts of $TiO_2$ and 50 parts of kieselguhr are then stirred in and to this mixture either 10 parts of freshly precipitated aluminum oxide or 5 parts of aluminum oxide and 8 parts of freshly precipitated ferric oxide are added together with sufficient normal KOH solution to cause the mixture to react neutral or weakly alkaline to phenolphthalein. The reaction mixture is then sucked and worked up in the usual manner and is an excellent catalyst for the oxidation of anthracene to anthraquinone and also for other catalytic organic oxidations.

In the specification the word "celite" has been used to describe the type of kieselguhr found on the west coast of United States and sold to trade by the Celite Company. This kieselguhr is characterized by the fact that it occurs naturally in the form of readily disintegrable fragments or bricks and is of high porosity.

Having thus described my invention, what I desire to secure by Letters Patent of the United States and claim is:

1. Catalysts comprising base exchange bodies free from chemically combined silicon containing catalytically active elements combined in non-exchangeable form.

2. Catalysts comprising base exchange bodies free from chemically combined silicon containing catalytically active elements combined in non-exchangeable form, and having at least one exchangeable base which is not an alkali metal.

3. The reaction products of base exchange bodies free from chemically combined silicon with compounds containing acidic radicals, the base exchange body being chemically combined with the acid radical in the form of a salt-like body.

4. As a new product, a diluted, non-silicious base exchange body, the diluent forming with the base exchange body a physically homogeneous structure.

5. The product according to claim 4, in which at least part of the diluent is catalytically active.

6. The product according to claim 1, having associated therewith a stabilizer.

7. The product according to claim 1, having associated therewith a stabilizer and a stabilizer promoter.

8. Base exchange bodies free from chemically combined silicon being the reaction products of at least three components, at least one component being a metallate, and at least one component being a metal salt.

9. The product according to claim 8, in which diluent bodies are incorporated in a physically, homogeneous structure.

10. The product according to claim 8, in which catalytically active diluents are incorporated into a physically, homogeneous structure.

11. A product according to claim 1, in which the base exchange body has been subjected to the action of a soluble silicate to produce surface silicification.

12. A catalyst composition containing a non-siliceous base exchange body having incorporated therewith at least one catalytically effective diluent.

13. A composition according to claim 12, in which the catalytic effective diluent is itself a base exchange body containing a catalytically effective component chemically combined in non-exchangeable form.

14. As new products, base exchange bodies free from chemically combined silicon, in which at least one of the reacting components is a complex compound.

Signed at Pittsburgh, Pennsylvania, this 23rd day of February, 1927.

ALPHONS O. JAEGER.